United States Patent [19]
Dudley

[11] Patent Number: 5,555,932
[45] Date of Patent: Sep. 17, 1996

[54] HEAT SHIELD FOR AN AUTOMOTIVE VEHICLE

[75] Inventor: Scott P. Dudley, Lake Orion, Mich.

[73] Assignee: Ford Motor Company, Dearborn, Mich.

[21] Appl. No.: 380,984

[22] Filed: Jan. 31, 1995

Related U.S. Application Data

[62] Division of Ser. No. 42,230, Apr. 2, 1993, abandoned.

[51] Int. Cl.$^6$ .............................. F28F 13/00; F28D 17/00
[52] U.S. Cl. ........................... 165/135; 165/10; 180/296; 244/160
[58] Field of Search ............................ 165/10, 135, 902; 180/89.2, 296; 244/160, 158 A

[56] References Cited

U.S. PATENT DOCUMENTS

| | | | |
|---|---|---|---|
| 3,375,867 | 4/1968 | Daunt | 165/10 |
| 3,820,629 | 6/1974 | Carlson et al. | 165/135 |
| 3,894,395 | 7/1975 | Laing | 165/86 |
| 4,003,426 | 1/1977 | Best et al. | |
| 4,085,816 | 4/1978 | Amagai et al. | 180/89.2 |
| 4,258,677 | 3/1981 | Sanders. | |
| 4,344,591 | 8/1982 | Jackson | 244/158 A |
| 4,415,118 | 11/1983 | Endo. | |
| 4,809,771 | 3/1989 | Kennel et al. | |
| 4,817,704 | 4/1989 | Yamashita. | |
| 4,860,729 | 8/1989 | Benson et al. | |
| 5,007,478 | 4/1991 | Sengupta. | |
| 5,056,588 | 10/1991 | Carr | 165/10 |
| 5,279,355 | 1/1994 | Schatz | 165/10 |
| 5,290,904 | 3/1994 | Colvin et al. | |

Primary Examiner—A. Michael Chambers
Attorney, Agent, or Firm—Raymond L. Coppiellie

[57] ABSTRACT

A heat shield 22 for an automotive vehicle 10 utilizes a phase change material 28 to absorb excess heat generated by a heat source within the vehicle. The heat shield 22 insulates a component adjacent to heat source and prevents the transmission of heat to the component.

2 Claims, 2 Drawing Sheets

HEAT SHIELD FOR AN AUTOMOTIVE VEHICLE

This application is a divisional of Ser. No. 08/042,230 filed Apr. 2, 1993 now abandoned.

BACKGROUND OF THE INVENTION

1. Field of the Invention

The present invention relates generally to a heat insulating shield for an automotive vehicle. More particularly, the present relates to a heat shield for an automotive vehicle, the shield including a phase change material for heat absorption.

2. Disclosure Information

It is known in the automotive industry that various components within the vehicle generate large amounts of heat which must be shielded from other components in the vehicle. For example, the exhaust system of a vehicle typically is located beneath the underbody or floorpan of the vehicle and generates a large amount of heat during operation of the vehicle. It is desirable to prevent the transfer of the heat generated from the exhaust system to the interior of the vehicle through the floorpan. Typically, this is done through a large, heavy, stamped metal shield interposed between the vehicle floorpan and the exhaust system components. In certain vehicle operating conditions, the exhaust system, as well as other components, produce heat in very different amounts over different lengths of time. For example, when a vehicle is pulling a trailer up a steep hill, the vehicle engine uses a lot of energy and produces excess heat which is passed through the exhaust system. As long as the vehicle continues to move, the heat is shed from the vehicle by the air movement caused by the moving vehicle and does not cause any significant heating problem. If the vehicle slows or comes to a stop at the crest of the hill, all of the heat bellows from the exhaust system onto the shielding until the exhaust system sufficiently cools. Because of these kinds of scenarios, shields have been overdesigned becoming larger and heavier to account for such operating conditions. A large shield must be used to fully encompass the component to be protected and deflect the large amount of heat generated in such a specific operating condition. By making the shields larger and heavier, there are cost and weight penalties associated with that component on the vehicle.

It would, therefore, be desirable to provide a smaller heat shield to be used in an automotive vehicle which absorbs all of the excess heat generated by a heat source or heat generating component and which avoids the disadvantages of the known heat shield systems.

The general principles of thermal energy storage by means of phase change materials are widely known. As materials are heated from a beginning state or phase, the solid phase, for example, to the liquid phase, energy is absorbed. In the temperature range at which the material changes from one phase to another, more energy is required to raise a temperature to an additional increment than to raise the temperature by the same increment when the material is not changing phase. This additional energy required at the phase change (or transition from one state to another) of the material is called the latent heat of transition. The singular advantage of phase change materials is their ability to absorb large amounts of heat during the melting period without increasing substantially in temperature.

Phase change materials have been used in the automotive arts before. For example, U.S. Pat. No. 4,258,677 discloses an elongated canister having a phase change material therein which surrounds an exhaust system. A heat exchanger is located in the top of the canister and the canister is filled with a phase change material. When the exhaust system is warmed, the phase change material transfers the heat of the exhaust system to the heat exchanger which then transfers the heat to a separate component within the engine to provide for additional heat in the engine. However, the patent does not teach the use of a phase change material as a heat shield for specific components within the vehicle as suggested by the present invention.

Numerous other systems have been proposed which utilize a phase change material for storing heat such as disclosed in U.S. Pat. Nos. 4,817,704 and 5,007,478. However, none of the systems teach or suggest the use of such a phase change material to provide thermal energy insulation to an automotive vehicle component. The present invention provides, however, a new, lightweight heat shield for an automotive vehicle which overcomes the problems associated with known heat shield structures at a reduced size penalty.

SUMMARY OF THE INVENTION

The present invention overcomes the above disadvantages by providing an apparatus for preventing the transfer of heat from a heat source to an adjacent component in an automotive vehicle. The apparatus comprises thermal protection means for preventing the transfer of heat from the heat source to the adjacent component, the means being configured to conform generally to the shape of the adjacent component and being interposed between the heat source and that component. The apparatus further comprises a phase change material disposed in the thermal protection means for absorbing the heat generated by the heat source. The thermal protection means comprises a shield having at least two layers with the phase change material interposed between the two layers.

In one embodiment of the invention, the shield is configured to conform generally to the shape of a floorpan of an automotive vehicle and includes an inner and outer layer joined together and interposed between the exhaust system and the floorpan. The shield prevents the transfer of heat from the exhaust system to the floorpan and includes a phase change material, such as a eutectic salt mixture therein.

It is an advantage of the present invention to provide a heat shield which overcomes the problems associated with the prior art and which is smaller than known shielding and which operates to absorb large amounts of waste heat. These and other objects, features and advantages of the present invention will become apparent from the drawings, detailed description and claims which follow.

DETAILED DESCRIPTION OF THE PREFERRED EMBODIMENTS

Figure 1:
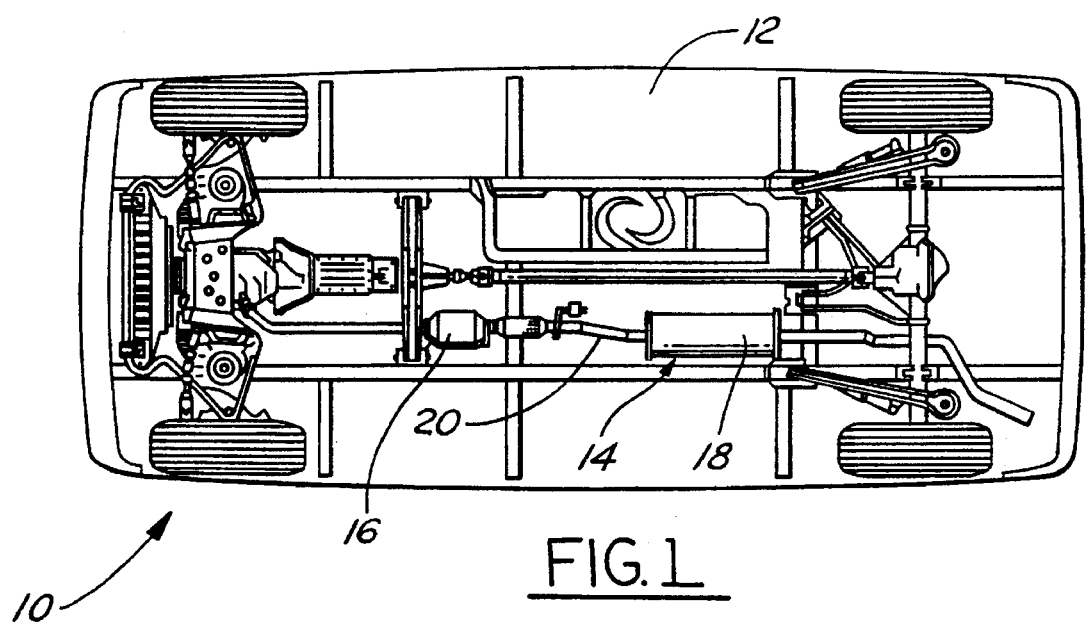
FIG. 1 is a plan view of the bottom side of an automotive vehicle.

Referring now to the drawings, FIG. 1 shows the bottom of an automotive vehicle 10, having an underbody, or floorpan 12 and an exhaust system 14, running from the front end or engine of the vehicle to the rear of the vehicle. In known construction, the exhaust system includes a catalytic converter 16 and a muffler 18 interconnected through piping 20 from the engine of the vehicle. As is well known in the art, the exhaust system 14 generates an excessive amount of heat while the vehicle is operating. Because of this excessive heat, it is desirable to prevent a transmission of the heat to the interior passenger compartment of the vehicle through the adjacent floorpan 12 of the vehicle.

Figure 2:
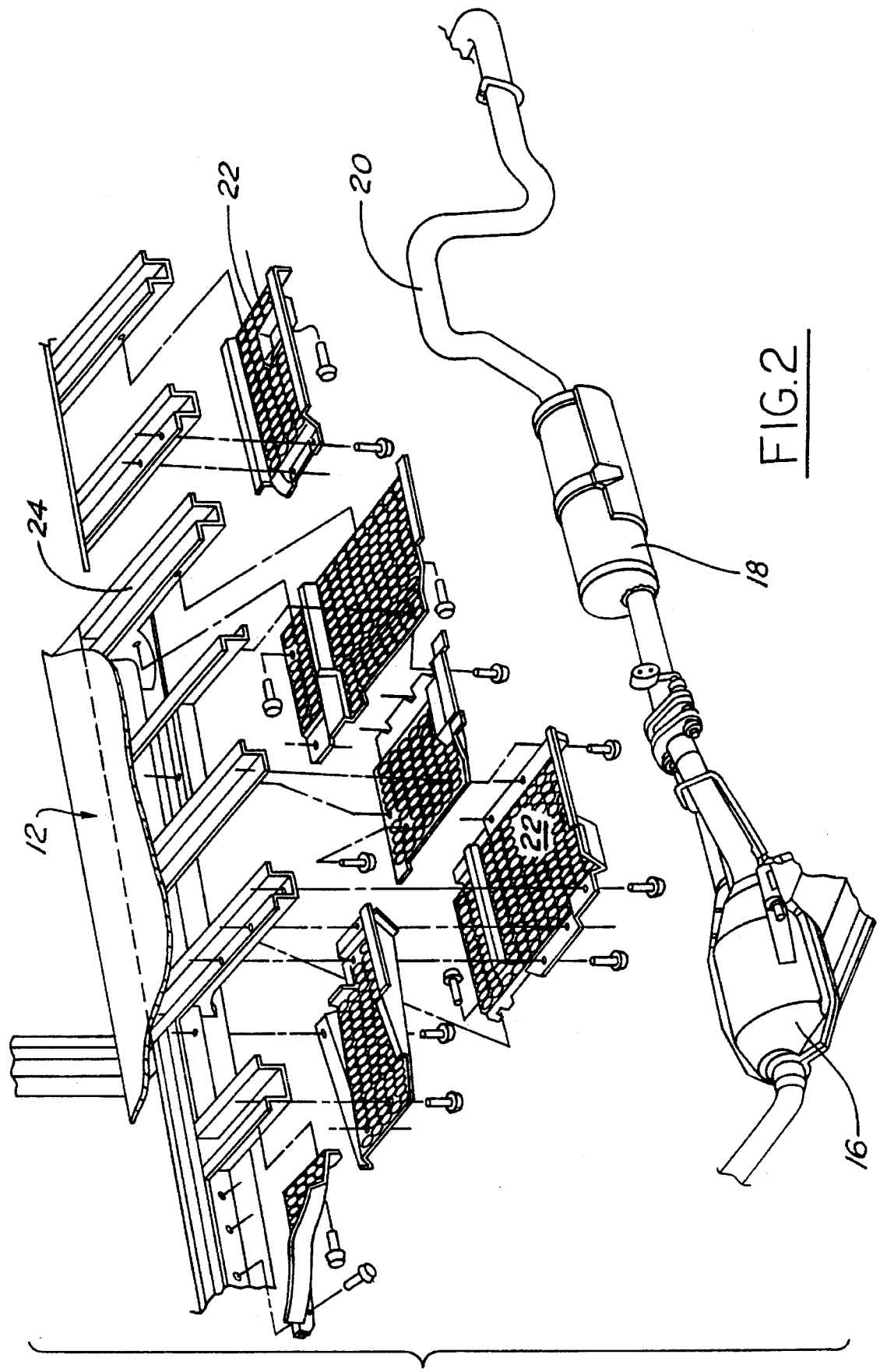
FIG. 2 is an exploded, partially sectioned view of the vehicle of FIG. 1 taken along lines 2—2 of FIG. 1.

As is shown in further detail in FIG. 2, and in accord with the present invention, the vehicle 10 includes shielding 22 interposed between the exhaust system 14 and the floorpan 12 of the vehicle. The shielding 22 is configured to conform generally to the shape of the component to which it is insulating from the heat source such as the exhaust system 14, and as shown in FIG. 2, conforms generally to the shape of those specific areas of the floorpan 12 which are deemed to require insulation from the heat source. For example, the temperature generated by the catalytic converter 16 and muffler 18 are generally quite excessive and would require shielding at those locations as opposed to other locations of the floorpan.

Figure 3:
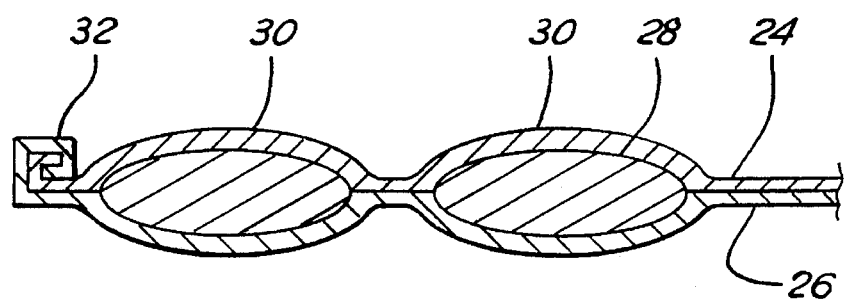
FIG. 3 is a sectional view of the present invention taken along lines 3—3 of FIG. 2.

The shielding 22 is configured generally as shown in FIG. 3. The shielding comprises a stamped member having an inner layer 24 and an outer layer 26 with a phase change material 28 disposed in a plurality of pockets 30 formed in the shield 22. In the preferred embodiment, the inner and outer layers 24, 26 of the shield 22 are stamped from a known material, such as steel. The phase change material 28 used in the shield is a congruent, melting eutectic mixture of 41.3 weight percent magnesium chloride hexahydrate and 58.7 weight percent magnesium nitrate hexahydrate. Other known eutectic salt mixtures having phase change properties can be utilized as well and are commercially available. The present invention is not meant to be limited solely to a specific phase change material. In the preferred embodiment, the above phase change material has a melting temperature of approximately 136° Fahrenheit. This material will absorb approximately 57 BTU's per pound at 136° Fahrenheit before increasing in temperature. This provides an advantage in that an equivalent amount of water, for example, would rise 57° Fahrenheit for the same heat input. A pound of carbon steel would rise in temperature approximately 570° Fahrenheit for the equivalent heat input, and thus the advantages of using this phase change material for the specific application of a heat shield for an exhaust system of a vehicle can be seen.

The heat shield of the present invention can be manufactured by first forming an inner layer of the shield to conform generally to the configuration of the component to be protected from the heat source. The eutectic salt mixture is prepared by mixing the crystalline materials in the correct proportions and then adding the mixture to the first layer of the shield. The top half of the shield is then formed and placed on the bottom half and the edges of the first and second layers are rolled to form a water tight seal, such as shown at 32 in FIG. 3, using standard sheet metal practices. The shield and its contents are then heated above the melting point of the phase change material and allowed to cool and solidify before being placed in the vehicle. Alternatively, the phase change material can be added to the shield by first melting it in a separate container and adding the molten material to a hollow thin walled shield at an open edge thereof. After the addition of the molten material to the shield, the open edge is then rolled tightly into a water tight seal using known sheet metal practices.

The present invention further contemplates the use of an additional, or second phase change material, such as barium hydroxide octahydrate. This is a commercially available salt having a melting point of 172° Fahrenheit, slightly higher than that of the magnesium hexahydrates listed above. This provides an additional amount of heat insulation in areas of the vehicle where such could be needed such as in heavy truck operations where temperatures could substantially be higher than that in passenger car vehicles.

In operation, the exhaust system 14 generates an excessive amount of waste heat, which is initially absorbed by the outer layer of the shield 22. As the heat is transferred from the outer layer 26 to the phase change material 28, the phase change material 28 absorbs the heat generated by the exhaust system. When the phase change material 28 reaches its melting point, the material further absorbs more heat as is well known in the art prior to forming into a molten liquid. The additional energy required at this phase change is the latent heat of transition of the material which is typically quite high for the eutectic salt mixtures described herein. The phase change material 28 absorbs the excess heat and acts as an insulator by preventing the transmission of the heat to the floorpan 12 and ultimately to the interior passenger compartment of the vehicle. As the vehicle begins to move, causing air current beneath the vehicle, or the vehicle is turned off, the phase change material begins to cool and solidify. When the material cools, the heat absorbed at the phase change point is given up slowly and does not adversely affect the component it is protecting. Thus, the heat shield of the present invention is an effective insulator to be used in the automotive art.

The present invention is not meant to solely be limited to the use of a heat shield interposed between an exhaust system and floorpan of an automotive vehicle. Various other components within an automotive vehicle are suitable for phase change shielding in a manner described generally above. For example, various sensors within the engine compartment of the vehicle are subject to high heat conditions from adjacent heat sources and could be insulated from the heat source by a shield configured generally as above. Various modules and motors within the vehicle can suitably be protected as well.

Various other modifications and variations of the present invention will, no doubt, become apparent to those skilled in the art. For example, the phase change shielding of the present invention could entirely surround a heat source within the vehicle or, alternatively, could be placed between the heat source and the adjacent component to be insulated. Furthermore, the pocket design described herein could be used for many heat shield applications but, alternatively, the shield could just take the shape of the component to be protected and the pockets could be eliminated. It is the following claims, including all equivalents, which define the scope of the invention.

What is claimed is:

1. An apparatus for preventing the transfer of heat from an exhaust system of an automotive vehicle to the floorpan of said vehicle, the apparatus comprising:

a shield stamped to conform generally to the shape of said floorpan, said shield including an inner layer and an outer layer that join together to form a plurality of pockets, said shield interposed between said exhaust system and said floorpan and being operative to prevent the transfer of heat from said exhaust system to said floorpan; and a first phase change material comprising a salt having a melting point greater than 135° F. disposed in said plurality of pockets, said material being operative to absorb the heat generated by said exhaust system.

2. An apparatus according to claim 1 further comprising a second phase material disposed in said plurality of pockets comprising a salt having a melting point greater than 170° F.

* * * * *